United States Patent
Cvijetic et al.

(10) Patent No.: US 9,195,644 B2
(45) Date of Patent: Nov. 24, 2015

(54) SHORT PHRASE LANGUAGE IDENTIFICATION

(71) Applicant: International Business Machines Corporation, Armonk, NY (US)

(72) Inventors: Sasa Cvijetic, Raleigh, NC (US); Adrian X. Rodriguez, Durham, NC (US); Felicia N. Soto, Raleigh, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 320 days.

(21) Appl. No.: 13/718,039

(22) Filed: Dec. 18, 2012

(65) Prior Publication Data

US 2014/0172413 A1    Jun. 19, 2014

(51) Int. Cl.
*G06F 17/27* (2006.01)
(52) U.S. Cl.
CPC .................... *G06F 17/275* (2013.01)
(58) Field of Classification Search
USPC ............................................ 704/4
See application file for complete search history.

(56) References Cited

U.S. PATENT DOCUMENTS

| | | | |
|---|---|---|---|
| 6,157,905 A | 12/2000 | Powell | |
| 6,292,772 B1 | 9/2001 | Kantrowitz | |
| 6,415,250 B1 * | 7/2002 | van den Akker | 704/9 |
| 6,999,932 B1 * | 2/2006 | Zhou | 704/277 |
| 7,516,062 B2 | 4/2009 | Chen et al. | |
| 2002/0091509 A1 | 7/2002 | Zoarez et al. | |
| 2010/0004919 A1 | 1/2010 | Macherey et al. | |
| 2011/0077933 A1 | 3/2011 | Miyamoto et al. | |
| 2012/0041753 A1 | 2/2012 | Dymetman | |

FOREIGN PATENT DOCUMENTS

CA    2284304 A1 *  9/1999  ............. G06F 17/28

OTHER PUBLICATIONS

"About Automatic Language Detection—Support—Office.com" [online] Retrieved on: Sep. 24, 2012. Retrieved from the Internet: <URL: http://office.microsoft.com/en-gb/help/about-automatic-language-detection-HP005258557.aspx>.
"Evaluation of Machine Translation—Wikipedia, the free encyclopedia" [online] Apr. 23, 2012. Retrieved from: <http://en.wikipedia.org/w/index.php?title=Evaluation_of_machine_translation&oldid=488868757>.

(Continued)

*Primary Examiner* — Abul Azad
(74) *Attorney, Agent, or Firm* — Edward J. Lenart; Katherine S. Brown; Kennedy Lenart Spraggins LLP

(57) ABSTRACT

A computer receives a short phrase. The short phrase is transmitted in a query to a search engine. The computer receives one or more search results from the search engine in response to the query, and parses one or more longer phrases that include the short phrase from each of the one or more search results. The computer transmits the one or more longer phrases to a language identification engine for identification of the language of the one or more longer phrases, and receives from the language identification engine the language of each of the one or more the longer phrases. The computer then determines the most likely language of the short phrase, based at least in part on the language of each of the one or more longer phrases.

18 Claims, 3 Drawing Sheets

(56) References Cited

OTHER PUBLICATIONS

Socher, R. et al. "Deep Learning in Natural Language Processing". The Stanford NLP (Natural Language Processing) Group. [online] Retrieved on: Sep. 24, 2012. Retrieved from the Internet: <http://nlp.stanford.edu/projects/DeepLearningInNaturalLanguageProcessing.shtml>.

"zdravo-Wiktionary" [online] May 10, 2012. Retrieved from: <http://en.wiktionary.org/w/index.php?title=zdravo&oldid=16795064>.

* cited by examiner

SHORT PHRASE LANGUAGE IDENTIFICATION

FIELD OF THE INVENTION

The present invention relates generally to the field of linguistics and language processing, and more particularly to identifying the language to which a textual phrase belongs.

BACKGROUND OF THE INVENTION

Numerous methodologies exist to assist in providing a machine translation of natural language content from the language of the content to another language. One common approach in machine translation applies rules-based methodologies. Rules-based methodologies rely on bilingual dictionaries, as well as linguistic information about the source and target languages, such as grammar rules and sentence structure. A simple rules-based approach might translate each word of the source language content into the corresponding word of the target language, and then rearrange, as needed, the target language words to comply with the grammar rules of the target language. Another common approach in machine translation uses statistical-based methodologies. This approach typically is a string- or phrase-based approach, and applies a probability distribution to a potential translation to find the most likely translation of a word based on, for example, the previous word or words that have been translated. These approaches can produce high quality translations. However, the source and target natural languages need to be identified. The target natural language is typically identified by the system user requesting the translation. The source language is usually identified by the system user requesting the translation, but can be identified by machine, usually through a dictionary look-up operation, if the source language content sufficient.

SUMMARY

Embodiments of the present invention disclose a method, computer program product, and system for identifying the language of a phrase. A computer receives a short phrase. The short phrase is transmitted in a query to a search engine. The computer receives one or more search results from the search engine in response to the query, and parses one or more longer phrases that include the short phrase from each of the one or more search results. The computer transmits the one or more longer phrases to a language identification engine for identification of the language of the one or more longer phrases, and receives from the language identification engine the language of each of the one or more the longer phrases. The computer then determines the most likely language of the short phrase, based at least in part on the language of each of the one or more the longer phrases.

DETAILED DESCRIPTION

Figure 1:
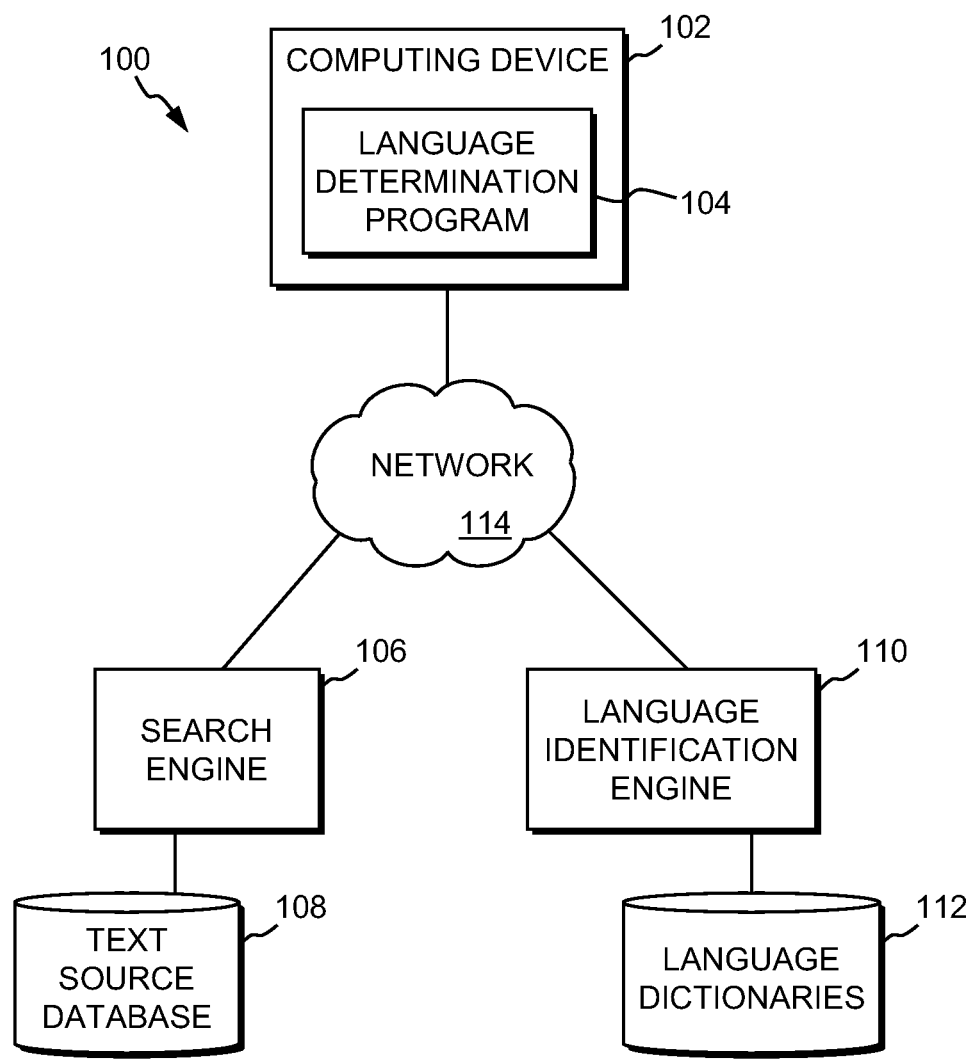
FIG. 1 is a functional block diagram illustrating a short phrase language identification system, in accordance with an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Embodiments of the present invention generally describe a short phrase language identification system that will identify the most likely language to which a short phrase belongs. The short phrase, along with the most likely language of the phrase, can then, for example, be passed to a machine translation system for translation. When a translation of a phrase in an unknown language is desired, the source language must be identified. This can be accomplished, for example, by a dictionary look-up on the words of the phrase. However, if the phrase is too short, the words of the phrase may appear in more than one language, making a high quality translation of the phrase difficult. In embodiments of the invention, the short phrase is submitted in a query to a search engine. The search results are parsed to identify longer phrases that include the short phrase. The longer phrases are then submitted to a language identification engine, and the language identified most often from the longer phrases can be considered the most likely language to which a short phrase belongs.

The present invention will now be described in detail with reference to the figures. FIG. 1 is a functional block diagram illustrating a short phrase language identification system, designated 100, in accordance with an embodiment of the present invention. In a preferred embodiment, short phrase language identification system 100 includes computing device 102, search engine 106 with associated text source database 108, language identification engine 110 with associated language dictionaries 112, and network 114 interconnecting at least computing device 102, search engine 106, and language identification engine 110.

Network 114 can be, for example, a local area network (LAN), a wide area network (WAN) such as the Internet, or a combination of the two, and can include wired, wireless, or fiber optic connections. In general, network 114 can be any combination of connections and protocols that will support communications between computing device 102, search engine 106, and language identification engine 110.

Search engine 106 includes text source database 108, and operates to receive a search query phrase from language determination program 104, described in more detail below, and return search results to the language determination program. In preferred embodiments of the invention, each search result includes the search query phrase in the context of a text passage that includes the search query phrase. For example, if the search query phrase is two words, each search result would include a text passage of three or more words that includes the search query phrase.

Text source database 108 includes digital content having a textual content on which search engine 106 performs its searches. As the textual content and the number of languages of the textual content of text source database 108 increases, the likelihood of search engine 106 returning results in the actual language of the search query phrase also increases. Text source database 108 can include such textual content as web pages, books, newspapers, and other digitized material with a textual content.

In preferred embodiments, search engine 106 and text source database 108 represent one or more web search engines, such as the Google® search engine, the Yahoo!® search engine, the Bing® search engine by Microsoft Corporation, or other regional and specific purpose search engines. In other embodiments, proprietary databases and search engines can be developed, or contractual agreements for access to private databases can be arranged.

Language identification engine 110 includes language dictionaries 112, and operates to return the most likely language(s) of textual phrases received from language determination program 104, described in more detail below. In preferred embodiments, language identification engine 110 and language dictionaries 112 represent one or more proprietary or open access web-based language identification engines, such as the Language Identifier tool by Xerox Corporation, Google® Translate, and Rosette® Language Identifier by Basis Technology Corporation. In other embodiments, proprietary language identification engines can be developed, based on one or more methodologies and approaches known to those skilled in the art, and on proprietary language dictionaries 112, which may contain etymologies and grammar rules related to the words contained in the dictionaries.

In various embodiments of the invention, computing device 102, which is described in more detail below with respect to FIG. 3, can be a laptop computer, tablet computer, netbook computer, personal computer (PC), a desktop computer, or any programmable electronic device capable of communicating with search engine 106 and language identification engine 110, and supporting the functionality required of embodiments of the invention.

Language determination program 104, which, in a preferred embodiment, resides on computing device 102, operates to receive a short textual phrase, typically from a user, and return a translation of the phrase in the most likely language or languages of the phrase. As used herein, "short" refers to the phrase length of a group of words for which a definitive language cannot be determined because the words or phrase are part of two or more languages. Language determination program 104 receives the short phrase, for example, via a graphical or textual user interface, not shown, and forms a search query that is transmitted to search engine 106. In a preferred embodiment, computing device 102 is a web server, and language determination program 104 is a web-based application that is accessible via a web interface. Depending on the specific search engine 106 and the method of accessing the search engine, the search query may, for example, consist only of the short phrase, or may be a search query command submitted to a command line interface of search engine 106.

After language determination program 104 receives search results from search engine 106 for the short phrase search query, the language determination program parses longer phrases from each result. For example, the first 25 results are parsed. In preferred embodiments, the longer phrases are phrases that include the short phrase, plus one or more words appearing on either side of the short phrase in the result. In certain embodiments, the longer phrase may include only words that appear before or after the short phrase. In other embodiments, the search result itself can be searched for the name of a language. If a language name is found, this can be used by language determination program 104 in determining the likely language of the short phrase. The longer phrases are then submitted by language determination program 104 to language identification engine 110.

After language determination program 104 receives the language identification results from language identification engine 110 for each parsed longer phrase, a most likely language of the short phrase is identified. For example, the language identified most often by language identification engine 110 from the longer phrases can be considered the most likely language to which the short phrase belongs.

After the most likely language to which the short phrase belongs has been identified, additional language processing on the short phrase can be done. For example, the short phrase, having a source language specified as the identified most likely language to which the short phrase belongs, can be processed by a translation engine into a desired target language.

Although short phrase language identification system 100 is depicted in FIG. 1 as a distributed system interconnected over network 114, this depiction is only one possible implementation of short phrase language identification system 100. The functionalities represented by language determination system 104, search engine 106, and language identification engine 110 may be, for example, integrated into a single system, distributed across fewer or more systems than are depicted, or subdivided along different functional boundaries.

Figure 2:
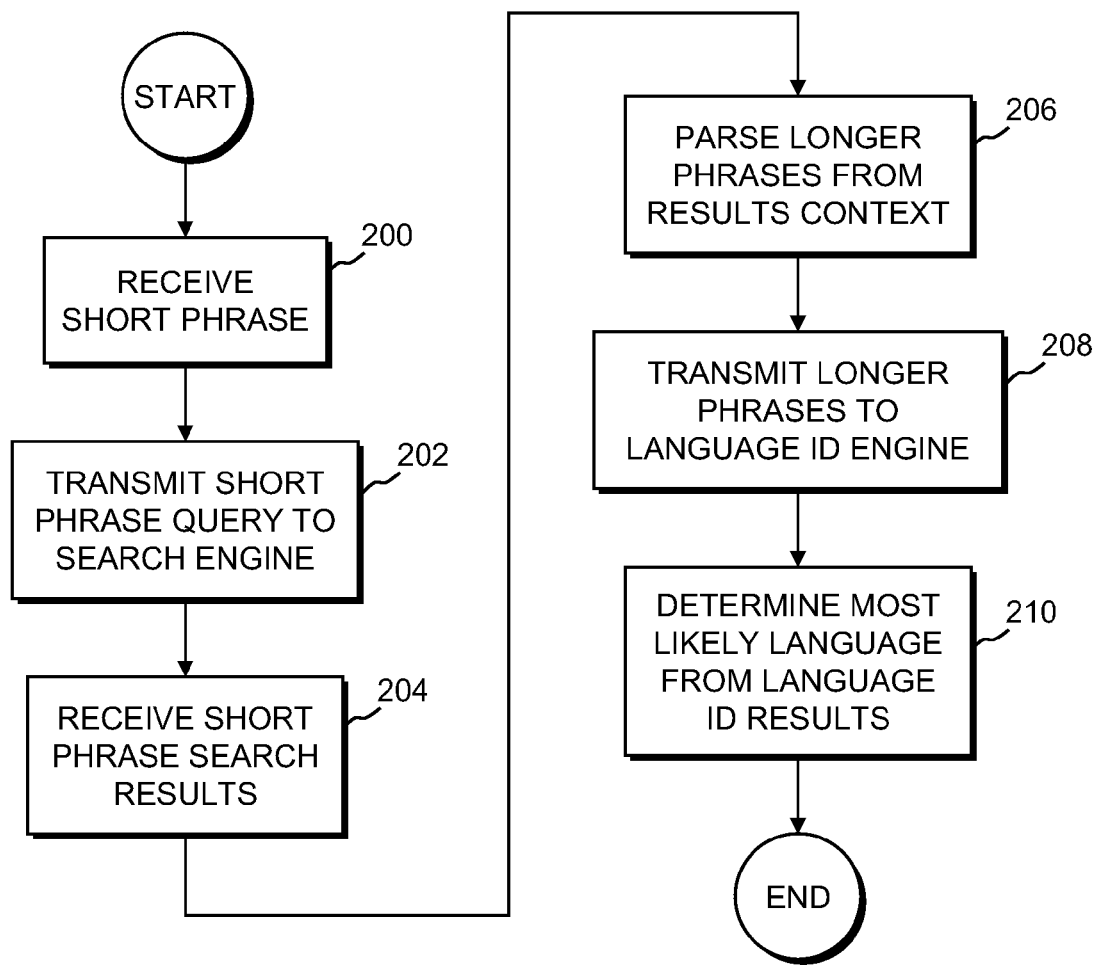
FIG. 2 is a flowchart showing operational steps of a language determination program on a computing device within the short phrase language identification system of FIG. 1.

FIG. 2 is a flowchart showing operational steps of a language determination program 104 on computing device 102 within the short phrase language identification system 100 of FIG. 1. Language determination program 104 receives a short phrase, for example, via a web interface (step 200). Language determination program 104 forms and transmits a search query for the short phrase to search engine 106 (step 202). After language determination program 104 receives the short phrase search results (step 204), the language determination program parses longer phrases containing the short phrase from the search results (step 206). The longer phrases are then transmitted to language identification engine 110 to identify the language of each of the longer phrases (step 208). After language determination program 104 receives the language identification results from language identification engine 110, the language determination program determines the most likely language from the results (step 210). For example, the language identified most often by language identification engine 110 from the longer phrases can be considered the most likely language to which the short phrase belongs.

Figure 3:
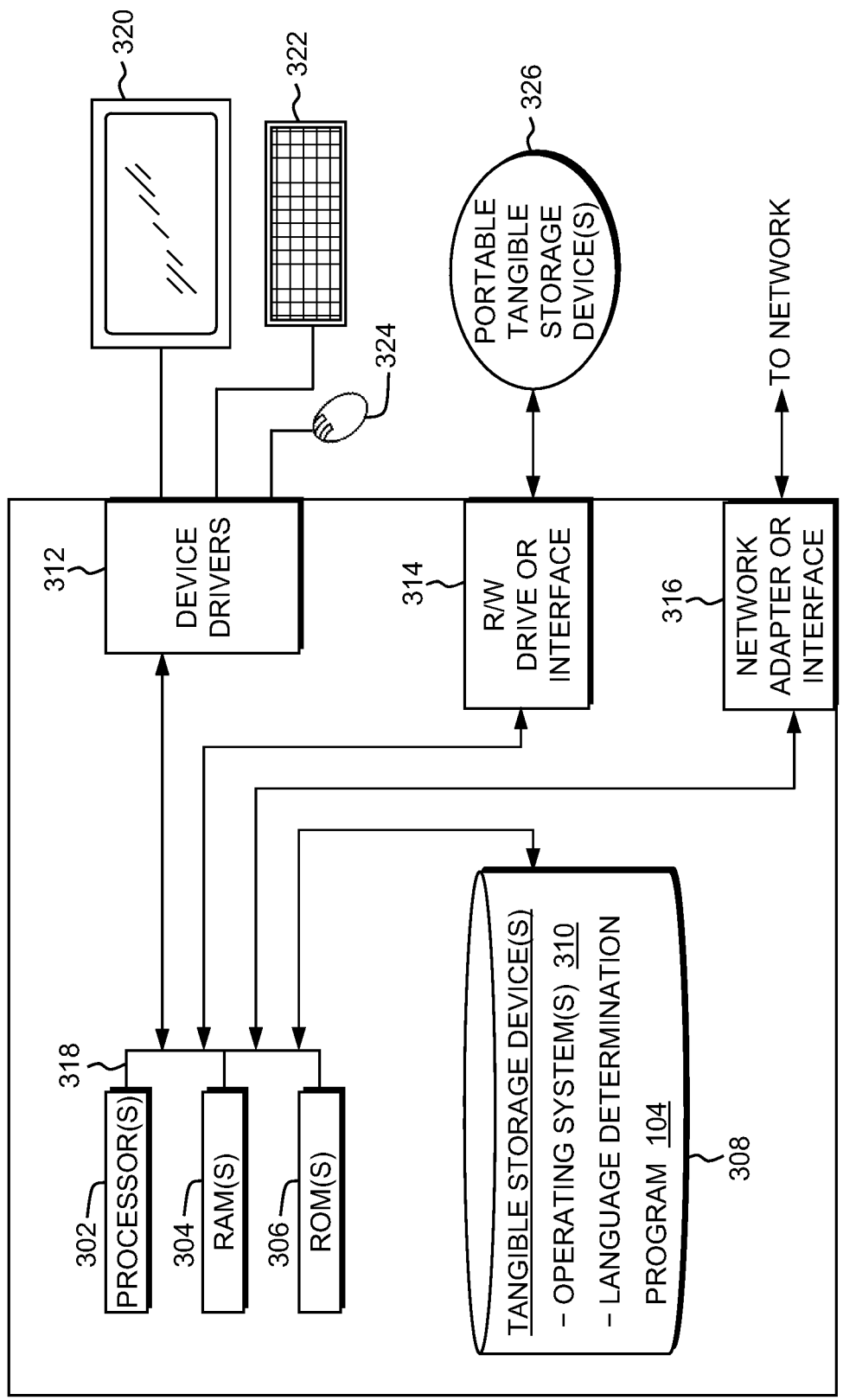
FIG. 3 is a block diagram of components of the computing device executing the language determination program, in accordance with an embodiment of the present invention.

FIG. 3 depicts a block diagram of components of the computing device 102 of short phrase language identification system 100 of FIG. 1, in accordance with an embodiment of the present invention. It should be appreciated that FIG. 3 provides only an illustration of one implementation and does not imply any limitations with regard to the environments in which different embodiments may be implemented. Many modifications to the depicted environment may be made.

Computing device 102 can include one or more processors 302, one or more computer-readable RAMs 304, one or more computer-readable ROMs 306, one or more tangible storage devices 308, device drivers 312, read/write drive or interface 314, and network adapter or interface 316, all interconnected over a communications fabric 318. Communications fabric 318 can be implemented with any architecture designed for passing data and/or control information between processors (such as microprocessors, communications and network processors, etc.), system memory, peripheral devices, and any other hardware components within a system.

One or more operating systems 310, and language determination program 104, are stored on one or more of the computer-readable tangible storage devices 308 for execution by one or more of the processors 302 via one or more of the respective RAMs 304 (which typically include cache memory). In the illustrated embodiment, each of the computer-readable tangible storage devices 308 can be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing device 102 can also include a R/W drive or interface 314 to read from and write to one or more portable computer-readable tangible storage devices 326. Language determination program 104 on computing device 102 can be stored on one or more of the portable computer-readable tangible storage devices 326, read via the respective R/W drive or interface 314 and loaded into the respective computer-readable tangible storage device 308.

Computing device 102 can also include a network adapter or interface 316, such as a TCP/IP adapter card or wireless communication adapter (such as a 4G wireless communication adapter using OFDMA technology). Language determination program 104 on computing device 102 can be downloaded to the computing device from an external computer or external storage device via a network (for example, the Internet, a local area network or other, wide area network or wireless network) and network adapter or interface 316. From the network adapter or interface 316, the programs are loaded into the computer-readable tangible storage device 308. The network may comprise copper wires, optical fibers, wireless transmission, routers, firewalls, switches, gateway computers and/or edge servers.

Computing device 102 can also include a display screen 320, a keyboard or keypad 322, and a computer mouse or touchpad 324. Device drivers 312 interface to display screen 320 for imaging, to keyboard or keypad 322, to computer mouse or touchpad 324, and/or to display screen 320 for pressure sensing of alphanumeric character entry and user selections. The device drivers 312, R/W drive or interface 314 and network adapter or interface 316 can comprise hardware and software (stored in computer-readable tangible storage device 308 and/or ROM 306).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and program product have been disclosed for a presentation control system. However, numerous modifications and substitutions can be made without deviating from the scope of the present invention. Therefore, the present invention has been disclosed by way of example and not limitation.

What is claimed is:

1. A method, performed by a computing device, for identifying the language of a phrase, comprising:
   receiving, via a communications fabric, a short phrase including one or more words;
   transmitting, via the communications fabric, the short phrase in a query to a search engine;
   receiving, via the communications fabric, one or more search results from the search engine in response to the query;
   parsing, by a processor of the computing device, the one or more search results including identifying one or more longer phrases that include the short phrase, the one or more longer phrases containing at least one more word than the short phrase;
   transmitting, via the communications fabric, the one or more longer phrases to a language identification engine for identification of the language of the one or more longer phrases;
   receiving, via the communications fabric, from the language identification engine the language of each of the one or more the longer phrases; and
   determining, by the processor of the computing device, the most likely language of the short phrase, based at least in part on the language of each of the one or more the longer phrases.

2. A method in accordance with claim 1, wherein the most likely language is determined based on the language identified most often by the language identification engine from the longer phrases.

3. A method in accordance with claim 1, wherein the short phrase is received via a web-based user interface.

4. A method in accordance with claim 1, wherein the search engine is a web-based search engine.

5. A method in accordance with claim 1, wherein the language identification engine is a web-based language identification engine.

6. A method in accordance with claim 1, wherein the short phrase is two words.

7. A method in accordance with claim 1, wherein the one or more longer phrases include three or more words.

8. A method in accordance with claim 1, wherein the short phrase includes a group of words that appear in two or more languages, and the one or more long phrases include respective groups of words that appear in one language.

9. A computer program product for identifying the language of a phrase, the computer program product comprising:
   one or more computer-readable storage device and program instructions stored on the one or more computer-readable storage device, the program instructions comprising:
   program instructions to receive a short phrase including one or more words;
   program instructions to transmit the short phrase in a query to a search engine;
   program instructions to receive one or more search results from the search engine in response to the query;
   program instructions to parse the one or more search results including identifying one or more longer phrases that include the short phrase, the one or more longer phrases containing at least one more word than the short phrase;
   program instructions to transmit the one or more longer phrases to a language identification engine for identification of the language of the one or more longer phrases;
   program instructions to receive from the language identification engine the language of each of the one or more the longer phrases; and
   program instructions to determine the most likely language of the short phrase, based at least in part on the language of each of the one or more the longer phrases.

10. A computer program product in accordance with claim 9, wherein the most likely language is determined based on the language identified most often by the language identification engine from the longer phrases.

11. A computer program product in accordance with claim 9, wherein the program instructions to receive a short phrase further comprise program instructions to receive the short phrase via a web-based user interface.

12. A computer program product in accordance with claim 9, wherein the search engine is a web-based search engine.

13. A computer program product in accordance with claim 9, wherein the language identification engine is a web-based language identification engine.

14. A computer system for identifying the language of a phrase, the computer system comprising:
   one or more computer processors;
   one or more computer-readable storage device;
   program instructions stored on the computer-readable storage device for execution by at least one of the one or more processors, the program instructions comprising:
   program instructions to receive a short phrase including one or more words; program instructions to transmit the short phrase in a query to a search engine;
   program instructions to receive one or more search results from the search engine in response to the query;
   program instructions to parse the one or more search results including identifying one or more longer phrases that include the short phrase, the one or more longer phrases containing at least one more word than the short phrase;
   program instructions to transmit the one or more longer phrases to a language identification engine for identification of the language of the one or more longer phrases;
   program instructions to receive from the language identification engine the language of each of the one or more the longer phrases; and
   program instructions to determine the most likely language of the short phrase, based at least in part on the language of each of the one or more the longer phrases.

15. A computer system in accordance with claim 14, wherein the most likely language is determined based on the language identified most often by the language identification engine from the longer phrases.

16. A computer system in accordance with claim 14, wherein the program instructions to receive a short phrase further comprise program instructions to receive the short phrase via a web-based user interface.

17. A computer system in accordance with claim 14, wherein the search engine is a web-based search engine.

18. A computer system in accordance with claim 14, wherein the language identification engine is a web-based language identification engine.

* * * * *